United States Patent [19]
Kawai et al.

[11] 3,944,765
[45] Mar. 16, 1976

[54] COMBINATION TURN-SIGNAL AND HAZARD-WARNING SWITCH MEANS FOR AN AUTOMOBILE

[75] Inventors: Yoshihiro Kawai; Atushi Takemura, both of Aichi, Japan

[73] Assignee: Kabushiki Kaisha Tokai Rika Denki Seisakusho, Aichi, Japan

[22] Filed: July 9, 1974

[21] Appl. No.: 486,927

[30] Foreign Application Priority Data
July 11, 1973 Japan.................... 48-81998[U]

[52] U.S. Cl............. 200/61.27; 200/6 R; 200/61.54; 340/81 F
[51] Int. Cl.²...................... H01H 3/16; B60Q 1/38
[58] Field of Search.............. 340/55, 67, 81 F, 76; 200/4, 6 R, 61.27–61.38, 61.54–61.57

[56] References Cited
UNITED STATES PATENTS

| | | |
|---|---|---|
| 3,510,839 | 5/1970 | Elliott et al...................... 340/67 X |
| 3,557,328 | 1/1971 | Winogrocki et al........ 340/81 F UX |
| 3,604,975 | 9/1971 | Suzuki et al................. 200/61.54 X |
| 3,641,493 | 2/1972 | Suzuki et al.......................... 200/4 X |
| 3,662,336 | 5/1972 | Suzuki et al...................... 340/81 F |
| 3,745,524 | 7/1973 | Suzuki ........................ 200/61.27 X |
| 3,809,833 | 5/1974 | Miller et al. ..................... 200/61.27 |
| R26,841 | 3/1970 | Brown ............................. 340/81 F |

*Primary Examiner*—James R. Scott
*Attorney, Agent, or Firm*—Woodhams, Blanchard and Flynn

[57] ABSTRACT

Combination turn-signal and hazard-warning switch means for an automobile wherein a turn-signal movable contact member has two operating portions disposed along a row of stationary contact members on an insulator plate and a hazard-warning movable contact member is movable into an operative position along said row of stationary contact members. The combination switch means thus constructed is capable of reducing the number of the stationary contact members required therefor and space required for the arrangement of the stationary contact members and capable of being formed very compactly.

12 Claims, 11 Drawing Figures

FIG. 8A
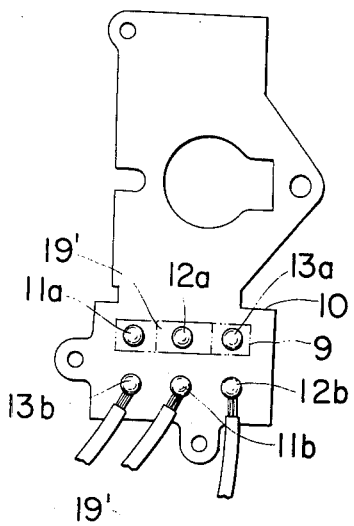
FIG. 8B
FIG. 7
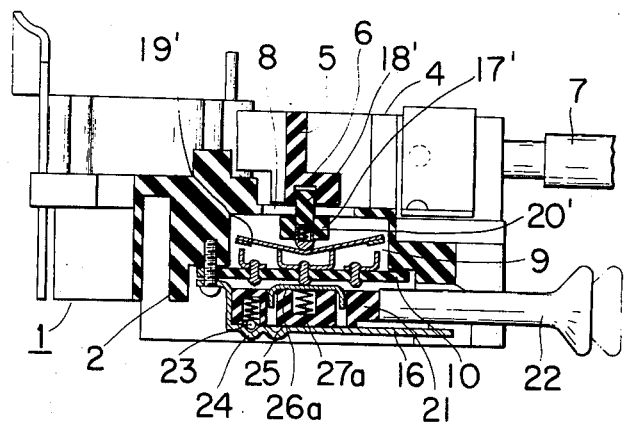

COMBINATION TURN-SIGNAL AND HAZARD-WARNING SWITCH MEANS FOR AN AUTOMOBILE

This invention relates to combination turn-signal and hazard-warning switch means for an automobile, and more particularly to an improvement in combination switch means of this kind for compactly combining two functions of turn-signal and hazard-warning in a switch assembly.

It is an object of the present invention to provide combination turn-signal and hazard-warning switch means for an automobile, wherein a turn-signal movable contact member has two operating portions disposed along a row of stationary contact members on an insulator plate and a hazard-warning movable contact member is movable into an operative position along said row of stationary contact members.

It is another object of the present invention to provide combination switch means as mentioned above, which is capable of reducing space required for arrangement of stationary contact members, thereby to structure the switch means compactly.

It is a further object of the present invention to provide combination switch means as mentioned above, which is capable of easily forming stationary contact member arrangement suitable for movement of movable contact members, readily forming appropriate gaps between stationary contact members and preventing possible tangling of said movable contact members with said stationary contact members.

It is a still further object of the present invention to provide combination switch means as mentioned above, which is capable of reducing the number of the stationary contact members required for the combination switch means.

The invention be better understood from the following description taken in connection with the accompanying drawings in which:

FIG. 7 is a vertical cross sectional view of another form of combination turn-signal and hazard-warning switch means according to the present invention;

FIG. 8A is a plan view of an insulator plate with turn-signal stationary contact member arrangement of FIG. 7 and FIG. 8B is a side view of a turn-signal movable contact member of FIG. 7.

Figure 1:
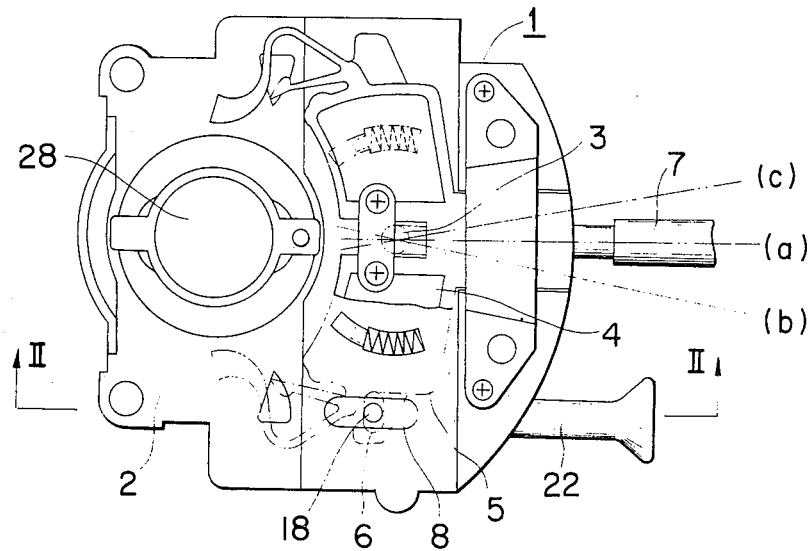
FIG. 1 is a partially cut-out plan view of one form of combination turn-signal and hazard-warning switch means according to the present invention.

Referring now to FIGS. 1 through 6, there is illustrated one preferred embodiment of the present invention. A direction indicator 1 of an automobile has a bracket 4 provided on a body member 2. Said bracket 4 is rotatable around 3 and movable into two positions for causing energization and flashing of the right and left indicator lights, respectively, from its neutral position as shown in FIG. 1. A control lever 7 is fixed to said bracket 4 and operated to control said bracket 4. Said bracket 4 is formed with wing portions 5 one of which has on its lower side an engaging groove 6 extending substantially at right angles with the extending direction of said control lever 7 of its neutral position. The body member 2 has on its upper side a sliding groove 8 extending in the direction transverse to said groove 6 and on its lower side a guide groove 9 formed in parallel with the extending direction of the control lever 7 of the neutral position.

An insulator plate 10 is mounted in said guide groove 9 at a bottom portion thereof and has on its upper side a row of first or turn-signal stationary contact members including a stationary contact 11a for a right indicator light, a stationary contact 12a for a power source and a stationary contact 13a for a left indicator light. Said row of the contacts extends in the direction parallel with the control lever 7 with the latter in its neutral position. Said insulator plate 10 has on the same side a further row of terminals 13b, 11b and 12b respectively of a lead wire 13f for the left indicator light, a lead wire 11f for the right indicator light and a lead wire 12f for the power source. These contacts 11a, 12a and 13a and terminals 13b, 11b and 12b vertically extend through the insulator plate 10 to make a row of second or hazard-warning stationary contact members including stationary contacts 11c, 12c and 13c and another row of second or hazard-warning stationary contact members including stationary contacts 13d, 11d and 12d on the lower side of the insulator. The contacts 11c, 12c and 13c are electrically connected to the contacts 11d, 12d and 13d, respectively, through respective printed wires 11e, 12e and 13e. A guide case 16 is provided under said insulator plate 10 so as to encase the stationary contacts 11c, 12c, 13c, 13d, 11d and 12d and from a guide in the direction of the extension in the lever 7 of the neutral position.

A first movable contact holder or contact actuator 17 is slidably mounted in the guide groove 9 above the insulator plate 10 with its upper projection 18 projected through the sliding groove 8 and received in the groove 6 of the movable bracket 4. A first or turn-signal movable contact 19 formed in a shape of elongated strip is mounted on said contact holder 17 in a state urged by a compression spring 20. Said movable contact 19 is in contact with the stationary contact 12a when the control lever 7 and the movable bracket 4 is in the neutral position.

Figure 2:
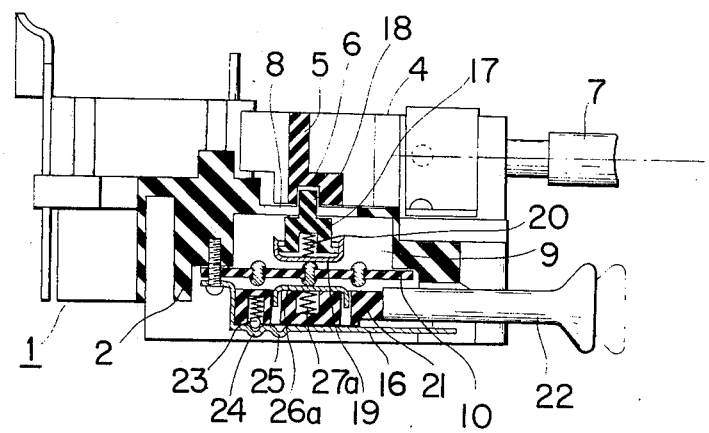
FIG. 2 is a vertical cross sectional view of FIG. 1 taken along line II — II.
Figure 3:
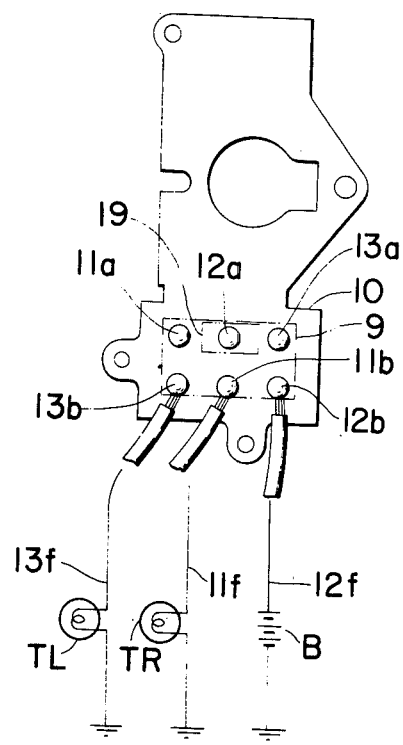
FIG. 3 is a plan view of an insulator plate showing turn-signal stationary contact member arrangement thereon of the present switch means.
Figure 4:
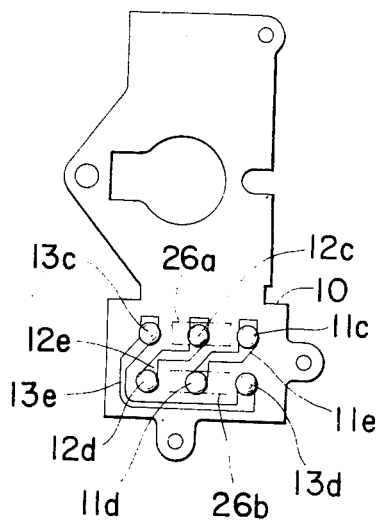
FIG. 4 is a rear view of the insulator plate showing hazard-warning stationary contact member arrangement thereon.
Figure 5:
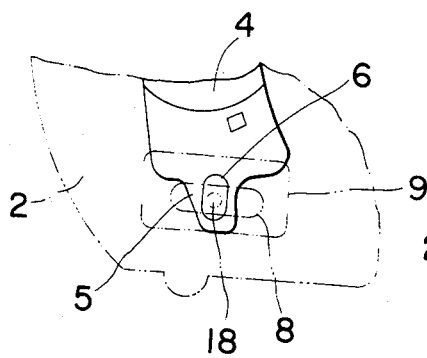
FIG. 5 is a fragmentary rear view of wing portion of bracket member of the present invention.
Figure 6:
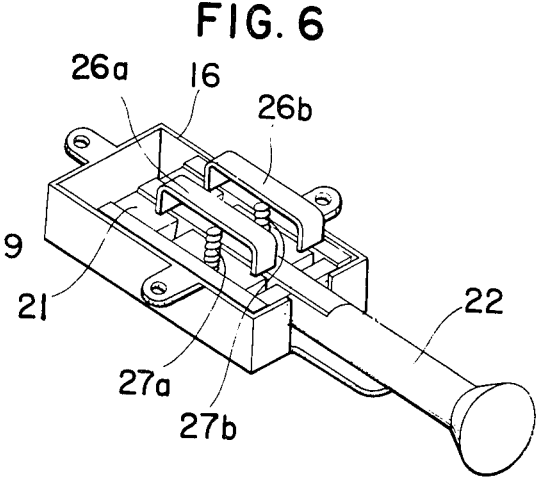
FIG. 6 is a perspective view of hazard-warning movable contact members and an actuator therefor.

Another contact holder or second movable contact actuator 21 is fitted in the guide case 16 under the insulator plate 10 and provided with a knob 22 for operation of the contact holder 21, which extends in the same direction as the control lever 7. The contact holder 21 is further provided, at its bottom portion, with a ball member 23 which is adapted to engage with either one of recesses 24 and 25 formed on the case 16 in a laterally spaced relation as depicted in FIG. 2. On the upper portion of said contact holder 21 are mounted two second or hazard-warning movable contacts 26a and 26b in a strip shape under urge by compression springs 27a and 27b, respectively. Said two movable contacts 26a and 26b are in a position contacting the stationary contacts 12c and 11d, respectively, when the contact holder 21 is in a neutral position and the ball member 23 is engaged with the recess 24.

In the direction indicator 1 thus constructed, it will be seen that when the control lever 7 is operated to actuate the bracket 4 from the neutral position (a) of FIG. 1 to either of the operative positions (b) and (c) for right or left indication, the contact holder 17 with its upper projection 18 engaging with the groove 6 is moved in the direction of the lever 7 in its neutral position to bring the movable contact 19 into contact with the stationary contacts 11a and 12a turning the right indicator light or bring said movable contact 17 into contact with the stationary contacts 12a and 13a turning the left indicator light. Thus, the direction the automobile is going to turn is indicated.

On the other hand, when the knob 22 is pulled, the contact holder 21 is moved in the guide case 16 into its operative position in the direction of the lever 7 of the neutral position along the rows of the second stationary members to bring the ball member 23 into engagement with the recess 25 and to get the movable contacts 26a and 26b into contact with the stationary contacts 12c and 13c, and the contacts 12d and 11d, respectively. Both of the right and left indicator lights are then energized simultaneously to indicate hazard-warning.

FIGS. 7 and 8 shows another embodiment of the present invention, wherein a first or turn-signal movable contact 19' of seesaw type has two operative portions at its opposite ends disposed along a row of first stationary contact members similar to those of the preceding embodiment. An actuator 17' has an upper projection 18' which extends through a sliding groove 8 and received in a groove 6 of a bracket 4 and has a compression spring 20' which acts to urge said contact 19' downwardly.

When a lever 7 is operated to actuate the bracket 4 into an operative position from a neutral position as shown in FIG. 7, said actuator 17' moves along said row of the stationary contact members to bring either one of the operative end portions of the first movable contact 19' into contact with a first stationary contact connected to a right indication light or left indication light to make direction indication of an automobile. The structure and operation for hazard-warning are identical with those of the foregoing embodiment.

Figure 9B:
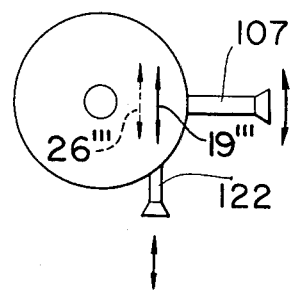
FIGS. 9A and 9B are diagrammatical views showing relationship between directions of movements of control lever and knob and direction of movements of actuators for movable contact members.
Figure 9A:
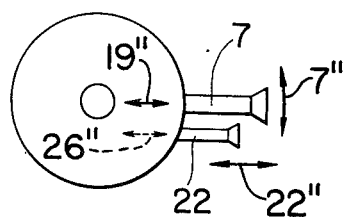

FIG. 9 shows relationship between directions of movements of control lever and knob and direction of movements of actuators for movable contacts. As shown in FIG. 9(A), in the foregoing embodiments wherein the lever 7 and the knob 22 are provided so as to extend in the same direction, the actuator 17 or 17' for the first movable contact member 19 or 19' is moved in the direction of a solid arrow 19 upon operation of the control lever 7 in the direction of arrow 7, while the actuator 21 for the second movable contact members 26a and 26b is moved in the direction of a broken line arrow 26 in parallel with said direction of the movement of the actuator 17 or 17' upon the actuation of the knob 22 in the direction of arrow 22. Whereas, in case a control lever 107 and a knob 122 are provided to extend in the directions transverse to each other, an actuator for a first movable contact member may be moved in the same direction as an actuator for second movable contact members as shown by solid and broken arrows 19''' and 26''', respectively in FIG. 9(B) through appropriate mechanical means to well achieve the objects of the present invention as set forth above.

What is claimed is:

1. A combination turn-signal and hazard-warning switch means for an automotile having right and left indicator lights, which comprises turn-signal actuating means including a control lever and hazard-warning actuating means including a control knob, and which further comprises:

housing means;

stationary contact means mounted on said housing means, said stationary contact means having an insulator plate member and sets of first and second stationary contact members respectively provided on opposite sides of said insulator plate member in row arrangement, respective contact members being connected to a power source and the right and left indicator lights;

first movable contact means including a first movable contact member having two operating portions disposed along said row arrangement of the first stationary contact members so as to make contact therewith and a first actuator member for said first movable contact member, which first actuator member is normally in a neutral position and movable into first and second operative positions upon the operation of said turn-signal actuating means to bring said operating portions into an indication operative position, making a turn-signal circuit through said first and second stationary contact members; and second movable contact means having second movable contact members disposed along said row arrangement adapted to contact said second stationary contact members and a second actuator member for said second movable contact members;

said second actuator member being normally in a neutral position and movable into an operative position in the direction of said row arrangement upon the operation of said hazard-warning actuating means to make a hazard-warning circuit in cooperation with said second movable contact members and said second stationary contact members through their contacting-relation;

means mounting said first and second movable contact means on said housing means for movement parallel to each other and to said row arrangement.

2. Combination turn-signal and hazard-warning switch means according to claim 1, wherein said turn-signal control lever in its central position extends perpendicular to the direction of extension of said hazard-warning control knob for movement parallel therewith.

3. Combination turn-signal and hazard-warning switch means according to claim 1, wherein said contact members on each side of said insulating plate member are confined to at least one and not more than two substantially parallel rows, each said row having at least two said contact members.

4. Combination turn-signal and hazard-warning switch means according to claim 3, in which each row consists of three evenly spaced contact members, each side of said insulative plate member has two substantially parallel rows of contact members, each of the three contact members in a row laterally opposing the corresponding contact member in the other row on the same side of the insulative plate member, and connecting to a contact member on the other side of said plate member.

5. Combination turn-signal and hazard-warning switch means according to claim 1, in which the movable contact members each engage only a single stationary contact member in their neutral position and wherein the second movable contact members in their neutral position are free of series connection in the series current path through the first movable contact member in either of the operative positions of the latter.

6. Combination turn-signal and hazard-warning switch means according to claim 1, including a plurality of conductive pin members fixedly extending through said insulative plate member, said pin members being in row arrangement and being confined to two substantially parallel rows, the ends of the pin members at opposite sides of said insulative plate member being said first and second stationary contact members, conductor means connecting a power source and the right and left indicator light to respective ones of said stationary contact members in each row, the first movable contact member extending along one said row of pin members, the second movable contact members extending along respective rows of pin members.

7. Combination turn-signal and hazard-warning switch unit according to claim 6, in which said first stationary contact members consist of a first row engageable by said first contact member and a second row to which said power source and right and left indicator lights are connected, said second stationary contact members consisting of corresponding first and second rows, said second movable contact members being first and second parallel contacts paralleling and respectively engaged with said first and second rows of said second stationary contact members.

8. Combination turn-signal and hazard-warning switch unit according to claim 6, in which said conductor means comprises conductors carried on said insulative plate member and substantially diagonally arranged so as to connect the first, second and third pin members of one row with second, third and first pin members of the other row, each said row having three pin members, said first, second and third pin members of said one row respectively connecting to said power source, one said indicator light, and the other indicator light, the first movable contact member and the second movable contact members each in their neutral positions contacting second pin members only, the first movable contact member being movable to connect said second pin member alternately with said first and third pin members of the opposed row, said second movable contact means being movable to independently connect the second and third pin members of each of said pin member rows.

9. Combination turn-signal and hazard-warning switch unit according to claim 6, in which said second movable contact members consist of a pair of parallel elongated strips in spaced side-by-side relatively insulated relation, each said strip facing a corresponding row of conductive pin members on said insulative plate member and each being continuously engaged with one respective pin member of each row, the strips each being of length sufficient to slidably engage and conductively bridge an adjacent pair of pin members of the opposed row upon shifting of said second actuator member to its operative position.

10. Combination turn-signal and hazard-warning switch means according to claim 9, wherein said first movable contact member consists of an elongated strip slidably engaging the central one of said first stationary contact members in the row opposed thereto and of length to simultaneously slidably engage one, and alternately the other, of the flanking stationary contact members of said row upon sliding out of its neutral position.

11. Combination turn-signal and hazard-warning switch means according to claim 9, wherein said first movable contact member is an elongate shallow V-shaped strip adapted to move into the first and the second operative position through see-saw movement and extending parallel to and opposing one of said second movable contact strips.

12. Combination turn-signal and hazard-warning switch means according to claim 9, wherein said turn-signal control lever in its neutral position extends in the same direction as said hazard-warning control knob and said elongate pair of strips.

* * * * *